April 13, 1965      W. D. HUSTON      3,177,722
EXPLOSION-PROOF PRESSURE GAUGE
Filed March 29, 1962
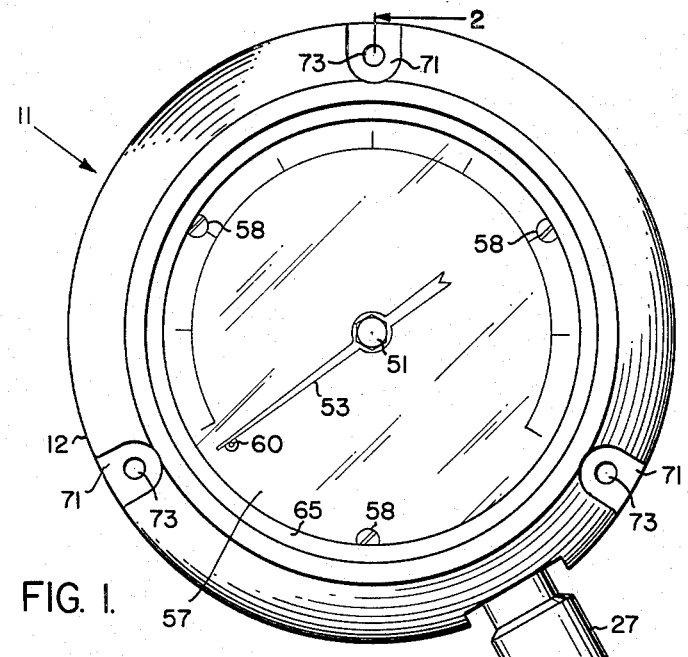
FIG. 1.
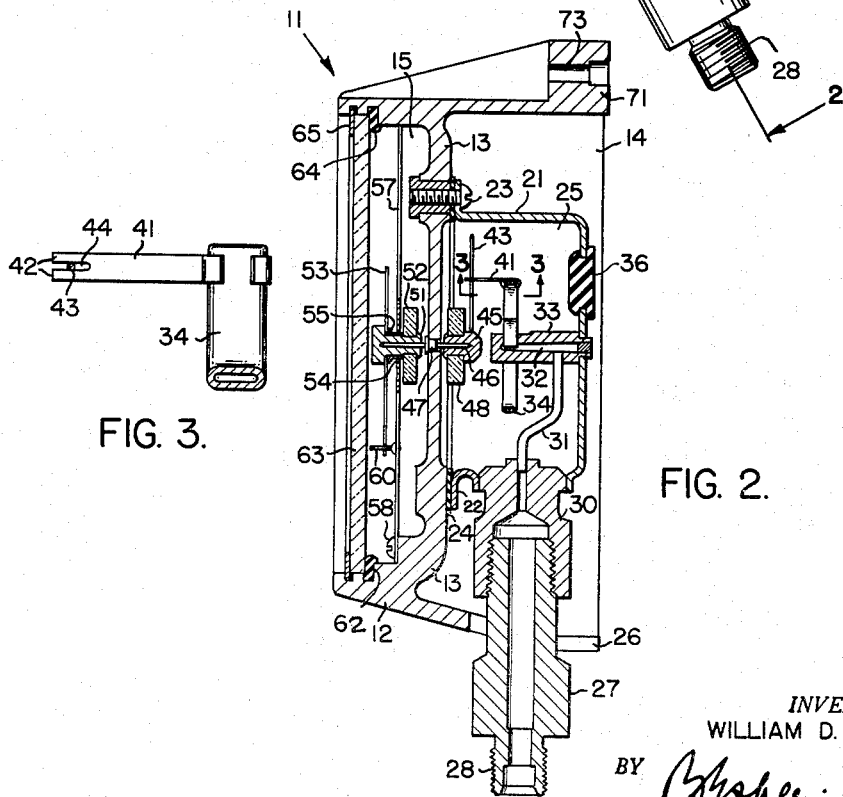
FIG. 3.
FIG. 2.
*INVENTOR.*
WILLIAM D. HUSTON United States Patent Office 3,177,722
Patented Apr. 13, 1965

3,177,722
EXPLOSION-PROOF PRESSURE GAUGE
William D. Huston, Rochester, N.Y., assignor to American Radiator & Standard Sanitary Corporation, New York, N.Y., a corporation of Delaware
Filed Mar. 29, 1962, Ser. No. 183,465
6 Claims. (Cl. 73—418)

This invention relates to pressure gauges, and more particularly to dial type pressure gauges and more especially to gauges actuated by a Bourdon tube.

Conventional pressure gauges are usually either of the Bourdon type or of the diaphragm type. With a diaphragm type gauge a pressure-operated diaphragm is used to transmit the pressure through leverage to the indicating pointer of the gauge. The chamber for applying pressure to the diaphragm is ordinarily outside the indicator casing; but the instrument is bulky and difficult to assemble. A Bourdon tube type gauge on the other hand is compact; but the tubular pressure-actuated element is housed within the indicator casing of the gauge.

Though Bourdon tube type pressure gauges can be designed with a high burst pressure and a good safety factor, under extreme emergency conditions such a pressure gauge may become a hazard to life and property. An accidental failure in such a pressure gauge can be more serious and damaging than a comparable failure in many other components in a pressurized system, for the pressure gauge is by intent designed to be read by an operator; and should an accidental blow-out occur while the gauge is being read there can be serious injury to the operator. When a non-breakable crystal is employed on the gauge, the risk is perhaps less, but when a breakable glass crystal is used the risk is high.

When used on hydraulic systems, the hazard is less for the liquid will normally be restricted in the pressure line and the pressure build-up in the gauge will be slow. Even there, however, if the liquid is toxic or corrosive, the danger to personnel and property can be great.

The danger is more extreme when the gauge is used in gas systems, where a burst in the system can result in explosive disintegration of the crystal cover glass as the gas expands against the outside atmospheric pressure. A more serious risk is where the gauge is used in a gas system containing oxygen, for the oxygen can generate a local explosion by internal friction causing a shock wave within the pressure gauge itself. In cases of this kind, the sudden pressure created by the local explosion, when added to the system pressure, produces a sudden burst and shock wave against the cover glass or crystal. In gas systems, moreover, if the fluid is toxic or corrosive, a sudden rupture or failure of the Bourdon tube can create considerable damage in the surrounding area.

Heretofore pressure gauges for applications where the risk of failure was great, have been designed with a fully open back, and with a nominally closed barrier wall between the Bourdon tube and the glass covered chamber containing the pointer and indicator dial. This type of gauge is commonly called a "solid front" or safety gauge. In this design, the barrier wall between the pressure element and the dial and cover glass is left open at the center; and the pointer shaft extends from the back of the casing through the opening in the barrier wall to position the pointer in the space between the barrier wall and the glass cover of the casing. The "solid front" construction is normally employed in pressure gauges having a C spring Bourdon tube that operates through gearing to drive the pointer shaft. The barrier wall is intended to prevent the shattering of the glass cover on the gauge casing should the Bourdon tube fail. However, because of the low driving energy imparted by the Bourdon tube to the pointer shaft, it is not practical to add a sealing gland or a close fitting bushing to seal-off the pressure between the front and back of the gauge. In practice it has been found, therefore, that where the open back of the gauge casing is mounted against a panel or wall, or is covered in any way, the pressure built up in the casing, upon failure of the Bourdon tube may not be relieved through the back of the case, but will instead be transmitted through the opening in the barrier wall and shatter the cover glass.

One object of this invention is to provide an explosion-proof pressure gauge which is simple and compact yet efficient for its purpose.

Another object of this invention is to provide an explosion-proof pressure gauge which may be employed to measure the pressure of combustible gases, toxic fluids, or the like, without danger either to personnel or to property should the gauge's pressure-actuated element fail.

Another object of the invention is to provide an explosion-proof pressure gauge employing a Bourdon tube as the pressure-actuated element, but in which the Bourdon tube is enclosed in a chamber completely sealed off from the dial and cover crystal of the gauge.

Another object of this invention is to provide improved means for transmitting the movement of the Bourdon tube to the gauge pointer in a gauge of the type described.

A further object of this invention is to provide an improved safety gauge of the type having a sealed barrier wall for preventing the shattering of the casing cover upon failure of the pressure-responsive element in the gauge, and wherein separate chambers are provided in the gauge on opposite sides of the barrier wall for housing the dial and pointer mechanism, and the pressure-responsive element, respectively.

Other objects of the invention will be apparent hereinafter from the specification and from the recital of the appended claims, particularly when read in conjunction with the accompanying drawing.

In the drawing:

FIG. 1 is a front elevational view of the face of a safety gauge made according to one embodiment of this invention;

FIG. 2 is a sectional view taken along line 2—2 in FIG. 1 and looking in the direction of the arrows; and FIG. 3 is a greatly enlarged sectional view taken along the line 3—3 of FIG. 2 and looking in the direction of the arrows.

Referring now to the drawing by numerals of reference, gauge 11 comprises a casing 12 having an integral, transverse wall 13 separating the casing into two chambers 14 and 15. Secured in the chamber 14 is a cup-shaped housing 21, which has an integral, ring flange 22 around its open end. Housing 21 is secured to one face of wall 13 by screws 23 which pass through the flange 22 and thread into the wall 13. An annular gasket 24 is interposed between the flange 22 and the casing wall 13 thereby to provide a chamber 25.

Mounted to project into chamber 14 through a slot 26 in the wall of casing 12 is a hollow, tubular fitting 27 which is externally threaded at its outer end, as denoted at 28 to be connected to the source of the fluid pressure which is to be measured. At its inner end this fitting 27 threads into an axially-bored fitting 30 which projects through an opening in the wall of housing 21 into the chamber 25. Secured at one end in the bore of fitting 30 is a tube 31 which is connected at its opposite end to the bore 32 of a "capillary stud" 33 that is mounted in the back or bottom wall of housing 21.

The rear end of the bore 32 is plugged; and adjacent its opposite end the bore 32 communicates through a radial port with a C-shaped or spirally-wound Bourdon tube 34. Tube 34 is wound in a plane which extends transverse to the axial centerline of the stud 33 so that upon flexing in response to the change in the pressure of a fluid in a given system, the closed end of the Bourdon tube will tend to travel in a spiral path about stud 33.

Offset from the stud 33, the bottom of housing 21 has an opening therein which is sealed by a resilient plug 36. Plug 36 is adapted to function as a safety valve for chamber 25, as will be described more fully below.

An actuating arm 41 is secured at one end to the closed end of Bourdon tube 34 and extends outwardly therefrom parallel to the axial centerline of stud 33 toward the casing wall 13. This arm is furcated at its free end, as denoted at 42 (FIG. 3); and a pin 43 engages in the slot 44 formed between the furcations of the arm. Pin or follower 43 is secured to and projects radially from a bushing 45 which is rotatably mounted on one end of pin 46 that is fixedly secured intermediate its ends by means of a bearing 47 in an opening in transverse wall 13. Mounted on bushing 45 to rotate therewith is an annular permanent magnet 48. The arm 41 is thus operative to positively pivot follower 43, bushing 45, and magnet 48 as a unit in opposite directions about pivot pin 46 upon the expansion and contraction of the Bourdon tube 34.

The pin 46 is double-ended, and on the end thereof that extends into chamber 15 there is rotatably mounted a cap bearing 51. An annular magnet 52 is secured to the bearing 51 adjacent the casing wall 13 and is rotatable therewith coaxially about pin 46. A pointer 53 has an opening intermediate its ends by means of which it is mounted on bearing 51; and a spaced sleeve 54 and spring washer 55 are mounted on bearing 51 between magnet 52 and pointer 53 to frictionally retain pointer 53 in an angularly adjusted position about bearing 51. The bearing 51 extends through a stationary, disc-shaped dial plate 57 which is secured adjacent its marginal edge by screws 58 to casing 12. Dial 57 is graduated (FIG. 1) on the side thereof remote from wall 13; and pointer 53 overlies this face to read against its graduations. A stop pin 60 is secured at one end to dial 57 and extends outwardly from its graduated face so as to be engageable by pointer 53 when the latter is in its zero position.

The chamber 15 is sealed by a circular, transparent cover 63 of glass or the like which fits relatively snugly into the open end of chamber 15, and adjacent its marginal edge sealingly engages an annular gasket 64 which is seated upon an annular shoulder 62 formed on the inner face of the casing. A snap retaining ring 65 engages the outer face of cover 63 adjacent the marginal edge thereof, and projects into an annular kerf formed in the inner face of the wall of the casing.

Casing 12 has a plurality of integral angularly spaced lugs 71 which are bored as denoted at 73 to accommodate bolts or the like for mounting casing 12 on a convenient surface when the gauge is in use.

In operation, the magnetic field existing between the axially aligned magnets 48 and 52 forms a magnetic coupling between the magnets so that upon rotation of magnet 48 in response to fluid pressure changes in Bourdon tube 34, a corresponding rotation is imparted to magnet 52, and hence to bearing 51 and the pointer 53 carried thereby, causing the pointer to indicate the pressure on dial 57. The magnetic field between magnets 46 and 52 also tends to draw the respective cap bearings 45 and 51 toward one another so that the latter will not tend to slide axially off the respective ends of the pivot pin 46 upon which they are mounted. However, the axial forces which attract bearings 45 and 51 toward one another on pin 46 are nominal, and the frictional forces which must be overcome to rotate the magnets about pin 46 are also nominal.

If Bourdon tube 29 accidentally ruptures during operation, the bushing 47 and pivot pin 46 will prevent any fluid from entering into the glass covered chamber 15. Moreover, the resilient plug 36 is designed to pop out of its opening in housing 21 at a predetermined pressure thereby permitting the fluid to exhaust to the atmosphere. Thus, there is no danger that leaking fluid will cause the transparent cover 63 to be shattered or otherwise blown out of recess 15.

Accordingly, it will be noted that applicant's novel gauge substantially eliminates the risk of injury to an operator. The magnetic coupling created by magnets 48 and 52 provides a substantially friction free means of transmitting movement from the pressure responsive Bourdon tube 34 to the indicator pointer 53. Furthermore, in applicant's gauge both the indicator mechanism defined by pointer 53 and dial 57, and the pressure responsive mechanism defined by Bourdon tube 34 are mounted, respectively, in sealed chambers 15 and 25 so that they are protected from moisture or dust particles which might tend to hinder the proper operation of the gauge elements.

While the safety valve has been described merely as a plug which permits the interior chamber 25 to be exhausted to the atmosphere, it is to be understood that any conventional safety valve might be employed in lieu of plug 36, and that such valve could be connected to a receiver for collecting any toxic, corrosive or combustible fluid which might happen to leak from Bourdon tube 34. Also, it is apparent that pin 46 could comprise two separate, axially aligned shafts that have adjacent ends integral with opposites sides, respectively, of wall 13. In the latter case, there would need be no central opening in wall 13 nor a bearing 47 to accommodate pin 46.

It is obvious, too, that instead of the pin and slot connection 43, 44 between a flat actuating arm 41 and follower 43, the actuating arm could be a stiff wire secured at one end to Bourdon tube 34 and having a loop at its free end engaging around pin 43.

Furthermore, while the invention has been described in connection with pressure gauges, it will be understood that certain features thereof are applicable to other types of gauges as, for instance, thermometers employing helically or spirally wound, bimetallic, temperature-responsive elements as the actuating means; e.g., in such gauges where the tube which houses the bimetallic element is plunged into a very hot liquid, there is always danger of rupture of the tube. Furthermore, where such a thermometer is used to measure temperatures in excess of 800° F., the bimetallic element is likely to become corroded due to oxidization. The gauge construction of the present invention, when applied to a thermometer having a bimetallic actuating element, will protect the indicating mechanism of the thermometer and its housing against damage by explosion, and has the advantage of sealing the housing for the bimetallic element so that even at temperatures in excess of 800° F. there is protection against corrosion by oxidization.

While the invention has been described in connection with a specific embodiment thereof, then, it will be understood that it is capable of further modification, and this application is intended to cover any variations, uses, or adaptations of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. A gauge comprising
   (a) a casing having intermediate its ends an integral, transverse wall, and having first and second closed chambers formed on opposite sides, respectively, of said wall,

(b) a condition responsive element mounted in one of said chambers for movement in response to a change existing at the exterior of said casing, (c) a first magnet rotatably mounted in said one chamber, (d) a first arm mounted at one end to rotate with said magnet in said one chamber and extending radially outwardly from the axis of rotation of said magnet, (e) a second arm connected adjacent one end thereof to said element to move therewith angularly about said axis of rotation upon a change in said condition, and having a portion adjacent the opposite end thereof engaging said first arm intermediate the ends thereof to transmit the angular movement of said second arm to said first arm, (f) a second magnet rotatably mounted in the other of said chambers coaxially of said first magnet and magnetically coupled to said first magnet to rotate therewith, (g) a graduated dial and a pointer mounted in said other chamber to be viewable from the exterior of said other chamber, and (h) means movable with said second magnet upon a change in said condition to cause a corresponding relative movement between said dial and pointer, respectively, thereby to provide a visual indication of said change, (i) said wall having a central opening therethrough, opposite sides of said wall confronting the interior of said first and second chambers, respectively, and (j) a stationary pin extending through and sealing said central opening in said wall, (k) said magnets being rotatably journaled on opposite ends, respectively, of said pin to rotate in unison in said chambers.

2. A gauge comprising (a) a casing having a transparent cover secured over a recess in one end thereof to define a first chamber, and having (b) a rigid housing secured to the opposite end thereof to define a second chamber coaxially of said first chamber, (c) a magnet in each of said chambers, (d) means mounting said magnets in magnetically coupled relation to rotate in said chambers in axial alignment, and in unison, (e) a graduated dial in said first chamber, (f) a pointer connected to the magnet in said first chamber to rotate therewith and having a portion overlaying the graduations on said dial to be readable thereagainst through said transparent cover, (g) a first member connected adjacent one end thereof to the magnet in said second chamber to rotate therewith and extending radially outwardly from the axis of rotation of said magnets, (h) a coiled Bourdon tube mounted in said second chamber with the open end thereof fixed in a stationary position and adapted to be placed in communication with a supply of fluid under pressure at the exterior of said chambers, and with the closed end thereof movable angularly about said axis of rotation of said magnets upon a change in the pressure of fluid in said tube, (i) a second member secured at one end to the closed end of said tube for movement therewith and connected to said first member to transmit the angular movement of said closed tube end to said first member, thereby to rotate said magnets and said pointer correspondingly, (j) said two chambers being separated from one another by a wall of said casing which is common to both chambers, and (k) said mounting means comprises a stationary shaft projecting into each chamber from opposite sides, respectively, of said wall and (l) a bearing mounted in each chamber over the free end of the shaft projecting thereinto, and wherein (m) the magnet in each chamber is secured to the respective bearing therein in such manner that the magnetic field extending between the magnets tends to urge said bearings axially toward one another thereby to hold the bearings over the free ends of the shaft.

3. A gauge comprising (a) a casing having a recess in at least one end thereof, (b) a transparent cover secured over said recess to define a first chamber, (c) a generally cup-shaped housing secured around its open end to said casing adjacent the opposite end thereof to form a second chamber axially aligned with the first-named chamber and separated therefrom by an integral, transverse wall of said casing, (d) a stationary shaft secured in and sealing an opening in said wall and extending into said chambers on opposite sides of said wall, (e) two magnetically coupled bearings rotatably mounted, respectively, on opposite ends of said shaft to rotate in unison coaxially of said shaft, (f) a graduated dial surrounding the bearing in said first chamber, (g) a pointer overlying said dial and rotatable with the last-named bearing to be readable through said transparent cover against the graduations on said dial, (h) a follower arm secured to the bearing in said second chamber for rotation therewith and projecting radially outwardly therefrom, (i) a condition responsive element mounted in said second chamber on said housing and movable relative thereto in response to a change in a condition existing at the exterior of said housing, (j) an actuating arm connected at one end to said element for movement thereby in an angular path about the axial centerline of said shaft upon a change in said condition, and having an opening in its opposite end through which said follower arm projects, whereby upon a change in said condition, said actuating arm positively rotates said follower arm thereby to impart a corresponding rotation to said bearings and pointer.

4. A gauge comprising (a) A casing having a recess in at least one end thereof, (b) a transparent cover secured over said recess to define a first chamber, (c) a generally cup-shaped housing secured around its open end to said casing adjacent the opposite end thereof to form a second chamber axially aligned with the first-named chamber and separated therefrom by an integral, transverse wall of said casing, (d) a stationary shaft secured in and sealing an opening in said wall and extending into said chambers on opposite sides of said wall, (e) two magnetically coupled bearings rotatably mounted, respectively, on opposite ends of said shaft to rotate in unison coaxially of said shaft, (f) a graduated dial surrounding the bearing in said first chamber, (g) a pointer overlying said dial and rotatable with the last-named bearing to be readable through said transparent cover against the graduations on said dial, (h) a follower arm secured to the bearing in said second chamber for rotation therewith and projecting radially outwardly therefrom, (i) a condition responsive element mounted in said second chamber on said housing and movable relative thereto in response to a change in a condition existing at the exterior of said housing, (j) an acutating arm connected at one end to said element for movement thereby in an angular path about the axial centerline of said shaft upon a change in said condition, and having an opening in its opposite end through which said follower arm projects, whereby upon a change in said condition, said actuating arm positively rotates said follower arm thereby to impart a corresponding rotation to said bearings and pointer, (k) safety valve means mounted in and operatively closing an exhaust port in the wall of said housing which communicates with the exterior thereof, (l) said valve means being operative upon an increase in the pressure in said second chamber to a predetermined amount to open said port, (m) a stationary, hollow stud secured to said housing and extending into said second chamber coaxially of the axis of rotation of said bearings, and (n) means connected to said stud and adapted to place the interior thereof in connection with a supply from the exterior of said housing of fluid under pressure, and wherein (o) said element comprises a Bourdon tube wound about the exterior of said stud in said chamber with the open end of said tube in communication with the interior of said stud and with the closed end of said tube secured to said one end of said actuating arm and movable angularly about said stem in response to any change in the pressure of a fluid in said tube.

5. A gauge comprising
(a) a casing having an integral, transverse wall intermediate the ends thereof,
(b) a transparent cover secured to said casing adjacent one end thereof and defining with said wall a sealed chamber in said casing,
(c) a double-ended pin extending through and sealing a hole in said wall and having one end thereof in said chamber and the other end thereof projecting externally of said chamber,
(d) a first magnet rotatably mounted on said one end of said pin,
(e) a graduated dial and a pointer mounted in said chamber, one of which is secured to said magnet to rotate therewith,
(f) said pointer overlying said dial to read against the graduations of said dial,
(g) a second magnet rotatably mounted on the outwardly-projecting end of said pin to be coupled magnetically with said first magnet,
(h) a spiral wound Bourdon tube mounted on said casing externally of said chamber with its open end adapted to be connected to a supply of fluid under pressure, and with its closed end movable angularly in response to a change in the pressure of the fluid in said tube,
(i) a follower arm secured to said second magnet to rotate therewith, and
(j) an actuating arm carried by said closed tube end and engaging said follower arm to impart thereto and to said second magnet the movement of said closed tube end.

6. An indicator device as claimed in claim 5, including means removably mounting said first and second magnets on said pin so that the magnetic field between said magnets attracts each to the other to hold the magnets on said pin.

References Cited by the Examiner
UNITED STATES PATENTS

| 1,192,574 | 7/16 | Schubert | 73—416 |
| 1,978,750 | 10/34 | Klein | 73—411 |
| 2,371,511 | 3/45 | Faus | 310—101 X |
| 2,693,896 | 11/54 | Brown | 73—416 X |

RICHARD C. QUEISSER, *Primary Examiner.*

JOSEPH P. STRIZAK, *Examiner.*